United States Patent
Shi et al.

(10) Patent No.: US 8,525,941 B2
(45) Date of Patent: Sep. 3, 2013

(54) ELECTROMAGNETIC INDUCTION TYPE LC PANEL AND METHOD FOR MANUFACTURING THE SAME AND LCD DEVICE

(75) Inventors: Xuanming Shi, Shenzhen (CN); Fuyou Li, Shenzhen (CN); Jiangli Wei, Shenzhen (CN)

(73) Assignee: Taiguen Technology (Shen_Zhen) Co., Ltd., Guangdong (CN)

( * ) Notice: Subject to any disclaimer, the term of this patent is extended or adjusted under 35 U.S.C. 154(b) by 26 days.

(21) Appl. No.: 13/329,206

(22) Filed: Dec. 16, 2011

(65) Prior Publication Data
US 2012/0092577 A1    Apr. 19, 2012

Related U.S. Application Data

(63) Continuation of application No. PCT/CN2010/073756, filed on Jun. 10, 2010.

(30) Foreign Application Priority Data

Jun. 19, 2009   (CN) .......................... 2009 1 0087391

(51) Int. Cl.
*G02F 1/1335*   (2006.01)
(52) U.S. Cl.
USPC ............................ 349/12; 349/187; 445/24
(58) Field of Classification Search
USPC .................. 349/12, 65, 58, 123, 43, 19, 187, 349/106; 445/24
See application file for complete search history.

(56) References Cited

U.S. PATENT DOCUMENTS

| | | | | |
|---|---|---|---|---|
| 6,521,472 B2 * | 2/2003 | Kim | ................................ | 438/29 |
| 6,806,925 B2 * | 10/2004 | Ishii et al. | ..................... | 349/106 |
| 6,876,416 B2 * | 4/2005 | Yun | ................................ | 349/123 |
| 7,755,616 B2 * | 7/2010 | Jung et al. | ..................... | 345/174 |
| 7,852,324 B2 * | 12/2010 | Chen et al. | ..................... | 345/173 |

FOREIGN PATENT DOCUMENTS

| | | |
|---|---|---|
| CN | 1534333 A | 10/2004 |
| CN | 1940843 A | 4/2007 |
| CN | 1983150 A | 6/2007 |
| CN | 201438247 U | 4/2010 |
| CN | 201438248 U | 4/2010 |
| JP | 06-208101 | 7/1994 |
| JP | 2004-302431 | 10/2004 |
| JP | 2008-84222 A | 4/2008 |
| KR | 2002-0022614 A | 3/2002 |
| KR | 2004-0084503 A | 10/2004 |

OTHER PUBLICATIONS

International Search Report of International Application No. PCT/CN2010/073756, dated Sep. 16, 2010.
Japanese Examination Report of corresponding Japanese Application No. 2012-515342, dated on Jul. 2, 2013.
Korean Examination Report of Korean Application No. 10-2012-7000870, dated Mar. 20, 2013.

* cited by examiner

*Primary Examiner* — Thoi Duong
(74) *Attorney, Agent, or Firm* — J.C. Patents

(57) ABSTRACT

An electromagnetic induction type LC panel includes a first substrate and a second substrate facing each other, a liquid crystal layer (63) filled between the first substrate and the second substrate, an antenna array made of conductive material, which is formed between a first base substrate (11) and a second base substrate (21) and insulated from conductive material in multi-film structures, and an input identification circuit connected to an output terminal of the antenna array.

9 Claims, 11 Drawing Sheets

ELECTROMAGNETIC INDUCTION TYPE LC PANEL AND METHOD FOR MANUFACTURING THE SAME AND LCD DEVICE

CROSS-REFERENCE TO RELATED APPLICATIONS

This application is a continuation of International Application No. PCT/CN2010/073756 filed on Jun. 10, 2010, which claims the priority benefit of Chinese Patent Application No. 200910087391.4, filed on Jun. 19, 2009. The contents of the above identified applications are incorporated herein by reference in their entirety.

FIELD OF THE TECHNOLOGY

The present invention relates to a handwriting input technique, particularly to an electromagnetic induction type liquid crystal display (LCD) panel with a handwriting input function and a method for manufacturing the same and an LCD device.

BACKGROUND

With the development of an input technique and a display technique, the combination of a common LCD device and a handwriting input device is a development trend meeting the market requirements.

In the prior art, the technical solutions which facilitate the LCD device to have a handwriting input function have the following forms. Firstly, according to realization principles, the handwriting input can be divided into a resistance type, a capacitance type and an electromagnetic induction type. The resistance type handwriting input device and the capacitance type handwriting input device can receive input signals by identifying touch actions. Generally, an independent resistance type handwriting input board or an independent capacitance type handwriting input board is assembled on the front side of the LCD device, i.e., on the side of the LCD device orientated towards the viewer, so as to receive the touch input actions. An electromagnetic induction type handwriting board identifies an input position through receiving an electromagnetic signal of an electromagnetic induction pen. Generally, the electromagnetic induction type handwriting board is also assembled on the front side of or the back side of the LCD device as one independent device, for example, it is assembled on the back side of a backlight module.

The above technical solutions for realizing the handwriting input function of the LCD device have the following defects. The thickness of the LCD device is increased due to the handwriting input board being as one independent device, which does not conform to the light and thin development trend of the LCD device. When assembled, the handwriting input board and the LCD device have the problems of unstable and unreliable assembly, thus causing input accuracy to be decreased. As for the electromagnetic induction type handwriting input board, when it is assembled on the back side of the LCD device, the thicknesses of an LC panel and the backlight module between the input board and the electromagnetic induction pen influence the identification of the electromagnetic signals and decreases input accuracy.

SUMMARY

It is an object of the present invention to provide an electromagnetic induction type LC panel and a method for manufacturing the same and an LCD device, so as to improve the accuracy and the reliability of LCD device handwriting input, and meet the light and thin development requirements of the LCD device.

One aspect of the present invention provides an electromagnetic induction type LC panel, comprising a first substrate and a second substrate facing each other, and a liquid crystal layer filled between the first substrate and the second substrate; the first substrate and the second substrate respectively comprise a first base substrate and a second base substrate as well as multi-film structures respectively formed on the first base substrate and the second base substrate, wherein:

the LC panel further comprises an antenna array, which is made of conductive material, formed between the first base substrate and the second base substrate, insulated from conductive material in the multi-film structures and used for identifying an electromagnetic signal.

Another aspect of the present invention provides a method for manufacturing an LCD substrate, comprising a step of forming a multi-film structure on a base substrate layer by layer, wherein before any one film is formed on the base substrate, the method further comprises:

forming an antenna array, which is made of conductive material and used for identifying an electromagnetic signal, and the antenna array is insulated from conductive material in the multi-film structure.

Another aspect of the present invention provides an LCD device adopting the electromagnetic induction type LC panel of the present invention, and the LCD device also comprises a backlight module and a frame, wherein the LCD device further comprises an input identification circuit connected with an output terminal of the antenna array.

With the abovementioned technical solutions, the antenna array is integrated in the LC panel in the present invention, thereby facilitating the LCD device to have an electromagnetic induction identification handwriting input function. Furthermore, as the antenna array is integrated in the LC panel, the thickness of the LCD device is hardly increased, thereby meeting the light and thin requirements of the LCD device and reducing the assembly cost. The antenna array is integrated in the LCD device, thus the identification accuracy and reliability of the antenna array are also increased.

DETAILED DESCRIPTION

Figure 1:
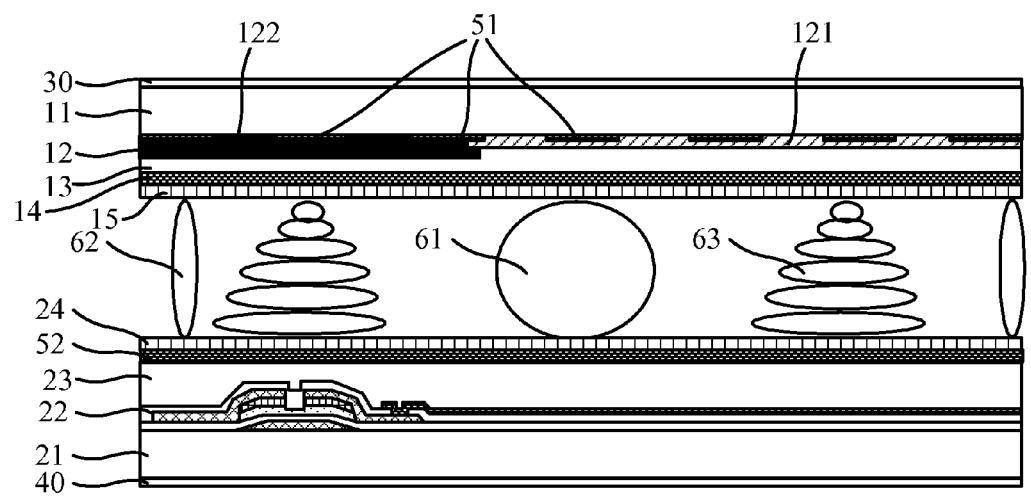
FIG. 1 and FIG. 15 are local cross-sectional structural schematic diagrams of an electromagnetic induction type LC panel provided in Example 1 of the present invention.

An electromagnetic induction type LC panel provided in the present invention comprises a first substrate and a second substrate facing each other. A liquid crystal layer is filled between the first substrate and the second substrate. The first substrate comprises a first base substrate and a multi-film structure formed on the first base substrate. The second substrate comprises a second base substrate and a multi-film structure formed on the second base substrate. The LC panel also comprises an antenna array, which is made of conductive material, formed between the first base substrate and the second base substrate and insulated from the conductive material in the multi-film structures. The antenna array is used for identifying electromagnetic signals and facilitates the electromagnetic induction type LC panel to have a handwriting input function based on electromagnetic induction principle.

The handwriting input based on the electromagnetic induction principle is completed by the cooperation between the antenna array and an electromagnetic induction pen. The antenna array includes a plurality of U-shaped coils which are perpendicular to each other. When the electromagnetic induction pen transmits electromagnetic signals, the antenna array can receive the electromagnetic signals and identify the frequency and the amplitude of the electromagnetic signals as well as the position of the electromagnetic induction pen, thus realizing the handwriting input. Therefore, a typical antenna array comprises a first-direction conductive wire and a second-direction conductive wire. The insulation is needed to be maintained between the first-direction conductive wire and the second-direction conductive wire. Furthermore, the first-direction and second-direction conductive wires are insulated from the conductive material in the LC panel, thus avoiding a short circuit with an operating circuit in the LC panel. Under the insulation requirements, there are a plurality of modes for forming the antenna array in the LC panel.

Among the abovementioned, one forming mode is as follows: a first-direction conductive wire and a second-direction conductive wire which are included in the antenna array are respectively formed at different positions between the base substrate and a film which are made of insulating material and adjacent to each other or between two films which are made of insulating material and adjacent to each other in the LC panel. No additional insulating layer is needed for this technical solution.

Another forming mode is as follows: a first-direction conductive wire and a second-direction conductive wire which are included in the antenna array are formed at a same position between the base substrate and a film which are made of insulating material and adjacent to each other or between two films which are made of insulating material and adjacent to each other in the LC panel, and an inner interval insulating layer is formed between the first-direction conductive wire and the second-direction conductive wire. In this technical solution, the first-direction conductive wire and the second-direction conductive wire are formed at the same position, and are insulated from each other by the inner interval insulating layer.

Another forming mode is as follows: a first-direction conductive wire and/or a second-direction conductive wire which are included in the antenna array are/is adjacent to a film of the conductive material in the LC panel, and an outer interval insulating layer is formed between the first-direction conductive wire and/or the second-direction conductive wire and the adjacent film of the conductive material. In this technical solution, the first-direction conductive wire and the second-direction conductive wire are provided at a same position or at different positions, and they can be formed at any positions. The antenna array and the conductive material in the LC panel are insulated from each other by the outer interval insulating layer.

The first substrate and the second substrate which are included in the LC panel are generally a color-film substrate and an array substrate respectively, and both of the color-film substrate and the array substrate comprise a base substrate made of glass generally. A pattern of a multi-film structure pattern formed on the base substrate has a plurality of designs. The antenna array can be formed in a plurality of different positions. The present invention is further described in detail through embodiments and with the combination of drawings as follows. The following examples are described in the case that the first substrate of the LC panel is the color-film substrate and the second substrate is the array substrate.

Example 1

FIG. 1 is a local cross-sectional structural schematic diagram of an electromagnetic induction type LC panel provided in Example 1 of the present invention. A plane of the LC panel is generally divided into a plurality of pixel units. This example is described with a typical thin-film transistor LCD device. The structure of one pixel unit in the LC panel is shown in FIG. 1.

A typical multi-film structure on the color-film substrate, starting from one side of a first base substrate 11 orientated towards a liquid crystal layer, comprises a color resin and black matrix layer 12, a first protection layer 13, a common electrode layer 14 and a first alignment film 15 in sequence. The color resin and black matrix layer 12 comprises color-film resins 121 and a black matrix 122 which is provided between the color-film resins 121 at interval. The first protection layer 13 is generally made of organic insulating material, and it can protect and planarize the color resin and black matrix layer 12. The common electrode layer 14 is made of transparent conductive material and provides a common voltage for liquid crystal molecules 63. The first alignment film 15 is generally made of the insulating material and formed with alignment grooves thereon adjacently to the liquid crystal layer to define the direction of the adjacent liquid crystal molecules 63.

A typical multi-film structure on the array substrate, starting from one side of a second base substrate 21 orientated towards the liquid crystal layer, comprises a thin-film transistor driving array film 22, a second protection layer 23 and a second alignment film 24 in sequence. The thin-film transistor driving array film 22 consists of a plurality of film patterns, which generally comprise a gate electrode, a gate scanning line, a gate insulating layer, an active layer, a source electrode, a drain electrode, a passivation layer, a pixel electrode, etc. The thin-film transistor driving array film 22 is covered with the second protection layer 23. Similar to the first protection layer 13, the second protection layer 23 is also made of the organic insulating material and can protect and planarize the thin-film transistor driving array film 22. The second alignment film 24 is formed on the second protection layer 23. The direction of the adjacent liquid crystal molecules 63 is defined by alignment grooves on the second alignment film 24.

After manufactured respectively, the color-film substrate and the array substrate are assembled together, wherein these two substrates are supported with a spacer 61 between them and sealed with frame sealant 62 at the periphery thereof, and then the liquid crystal molecules 63 are filled.

Based on an imaging principle of the LCD device, the LC panel generally also comprises an upper polarizer 30 and a lower polarizer 40 respectively on an upper side and a lower side thereof, and they operate with the liquid crystal molecules 63 which make the light twist such that different images are displayed.

An antenna array provided in the LC panel is made of the conductive material, and preferably is made of transparent conductive material. Specifically, the material is the same with the material adopted by the pixel electrode and the common electrode layer, for example, Indium Tin Oxides (ITO), etc. In this example, the antenna array comprises a first-direction conductive wire 51 and a second-direction conductive wire 52 which are perpendicular to each other. The first-direction conductive wire 51 and the second-direction conductive wire 52 respectively include a plurality of U-shaped coils which have the same direction, and these U-shaped coils are arranged on the whole surface of the base substrate or films. The distance between the central points of two adjacent U-shaped coils is in the range of about 6.5 mm to about 7 mm. The first-direction conductive wire 51 and the second-direction conductive wire 52 are respectively formed at different positions between the base substrate and a film which are made of insulating material and adjacent to each other or between two films which are made of insulating material and adjacent to each other in the LC panel.

Specifically, one of the first-direction conductive wire 51 and the second-direction conductive wire 52 is formed on a surface of the first base substrate 11 orientated towards the inner side of the LC panel, and the other one is formed on a surface of the second protection layer 23 orientated towards the inner side of the LC panel. For example, the first-direction conductive wire 51 may be formed on the first base substrate 11 which is adjacent to the color resin and black matrix layer 12 made of insulating material. The second-direction conductive wire 52 is formed on the second protection layer 23 which is adjacent to the second alignment film 24 made of the insulating material.

The color resin and black matrix layer as well as the first protection layer are all the films made of the insulating material. That is, the first-direction conductive wire or the second-direction conductive wire may be respectively formed at any two positions of the following positions:

a position between the first base substrate and the color resin and black matrix layer;

a position between the color resin and black matrix layer and the first protection layer; and a position between the second protection layer and the second alignment film.

With the adoption of the abovementioned technical solution, the first-direction conductive wire and the second-direction conductive wire are formed on the base of the existing LC panel by directly using the transparent conductive material. And no additional insulation film is needed.

With the adoption of the technical solution in the present example, based on the existing LC panel, the conductive wires in the antenna array can be integrated in the LC panel. On the one hand, an independent handwriting input board, such as a PCB, is not needed to be assembled at the outside of the LCD device, thereby meeting the light and thin requirements of the LCD device, saving manufacturing and assembly costs at the same time, and avoiding the defect that the LC panel is easily damaged during the assembly of the independent handwriting input board. On the other hand, the antenna array and the LC panel are combined tightly, thus increasing the accuracy and the reliability of identifying the positions of electromagnetic signals.

Example 2

In Example 2 of the present invention, the structure of the LC panel is substantially the same with that of Example 1. An antenna array of Example 2 comprises a first-direction conductive wire and a second-direction conductive wire which are perpendicular to each other. The difference of the Example 2 from Example 1 is as follows: insulating transparent films are covered on the first-direction conductive wire and the second-direction conductive wire. That is, when the first-direction conductive wire and the second-direction conductive wire are formed in the LC panel, the insulating transparent films can be respectively provided at two sides of the first-direction conductive wire and the second-direction conductive wire, thus guaranteeing that the first-direction conductive wire and the second-direction conductive wire are insulated from the LC panel.

In the present example, if an inner interval insulation lay 53 is formed between the first-direction conductive wire 51 and the second-direction conductive wire 52, insulation is firstly maintained between the first-direction conductive wire 51 and the second-direction conductive wire 52.

Figure 2:
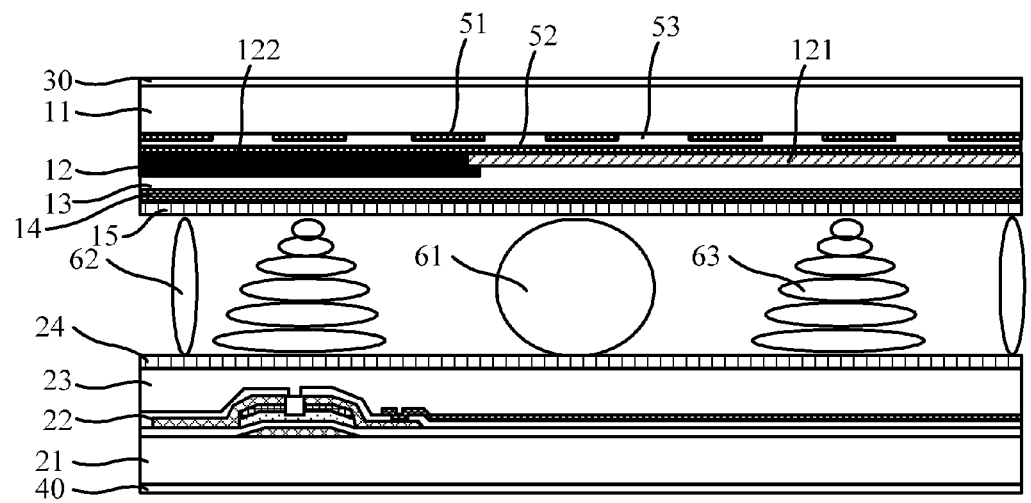
FIG. 2 is a cross-sectional structural schematic diagram of Embodiment 1 of an electromagnetic induction type LC panel provided in Example 2 of the present invention.
Figure 3:
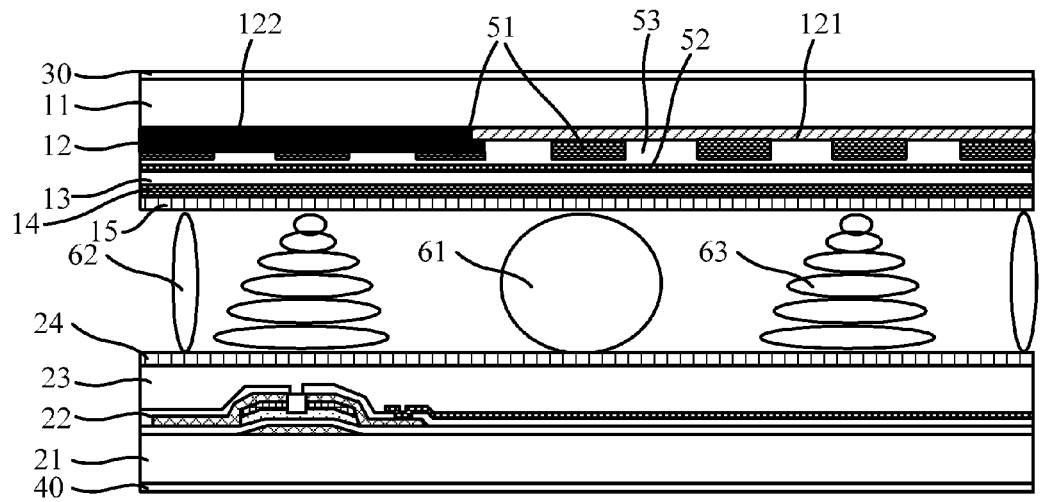
FIG. 3 is a cross-sectional structural schematic diagram of Embodiment 2 of the electromagnetic induction type LC panel provided in Example 2 of the present invention.
Figure 4:
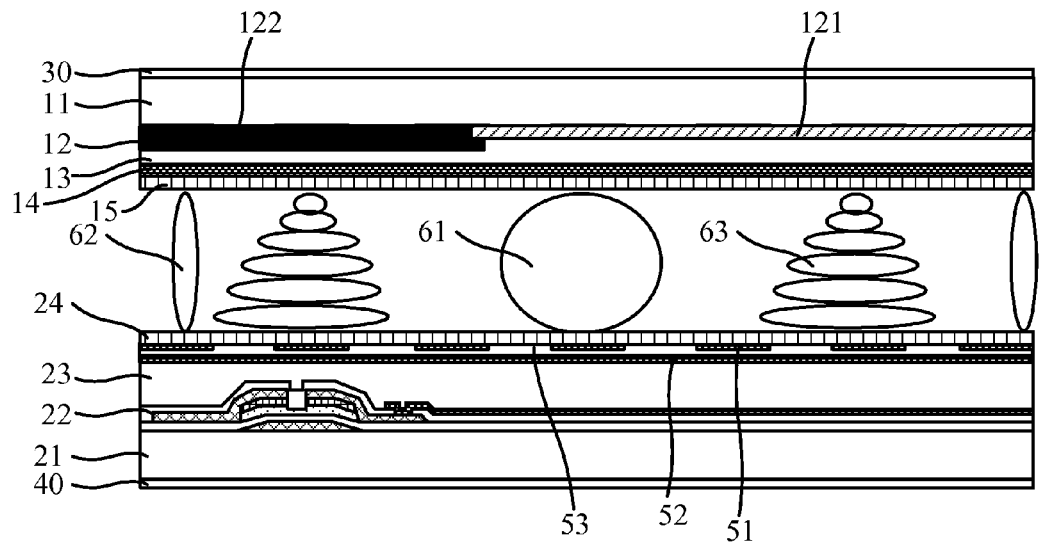
FIG. 4 is a cross-sectional structural schematic diagram of Embodiment 3 of the electromagnetic induction type LC panel provided in Example 2 of the present invention.

The antenna array and the inner interval insulating layer 53 may have a plurality of positions to be formed, specially they are formed at a same position between the base substrate and a film which are made of the insulating material and adjacent to each other or between two films which are made of the insulating material and adjacent to each other. FIGS. 2-4 are cross-sectional structural schematic diagrams of respective embodiments of an electromagnetic induction type LC panel provided in Example 2 of the present invention, which are described with the color-film substrate and the array substrate having the structure in Example 1.

As shown in FIG. 2, the first-direction conductive wire 51, the inner interval insulating layer 53 and the second-direction conductive wire 52 may be formed between the first base substrate 11 and the color resin and black matrix layer 12.

Or, as shown in FIG. 3, the first-direction conductive wire 51, the inner interval insulating layer 53 and the second-direction conductive wire 52 may be formed between the color resin and black matrix layer 12 and the first protection layer 13.

Or, as shown in FIG. 4, the first-direction conductive wire 51, the inner interval insulating layer 53 and the second-direction conductive wire 52 may be formed between the second protection layer 23 and the second alignment film 24.

Example 3

In Example 3 of the present invention, the structure of the LC panel is substantially the same with that of Example 1. An antenna array of Example 3 comprises a first-direction conductive wire and a second-direction conductive wire which are perpendicular to each other. The difference of the Example 3 from Example 1 is as follows: an outer interval insulating layer is covered on the first-direction conductive wire and/or the second-direction conductive wire, thus guaranteeing that the first-direction conductive wire and the second-direction conductive wire are insulated from the conductive material of the LC panel.

In the abovementioned technical solution, the first-direction conductive wire and the second-direction conductive wire may be provided at any position between the two base substrates of the LC panel. They can be provided at a same position and maintained insulation by the inner interval insulating layer; or they can be provided at different positions. The present example is still described with the typical color-film substrate and array substrate of the abovementioned Examples. FIGS. 5-8 are cross-sectional structural schematic diagrams of respective embodiments of an electromagnetic induction type LC panel provided in Example 3 of the present invention.

Figure 5:
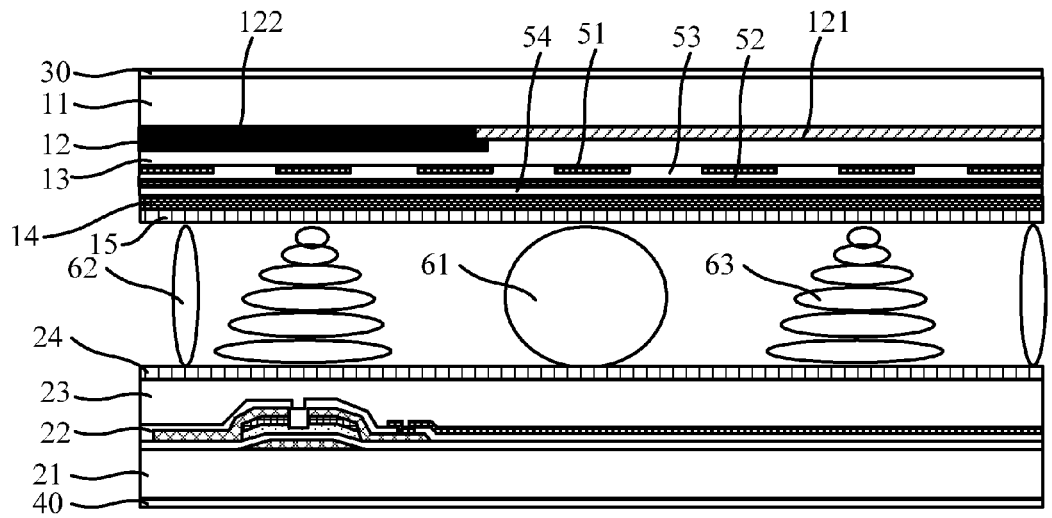
FIG. 5 is a cross-sectional structural schematic diagram of Embodiment 1 of an electromagnetic induction type LC panel provided in Example 3 of the present invention.

As shown in FIG. 5, the first-direction conductive wire 51, the inner interval insulating layer 53, the second-direction conductive wire 52 and an outer interval insulating layer 54 may be formed between the first protection layer 13 and the common electrode layer 14, so that the insulation between the second-direction conductive wire 52 and the common electrode layer 14 is maintained through the outer interval insulating layer 54.

Figure 6:
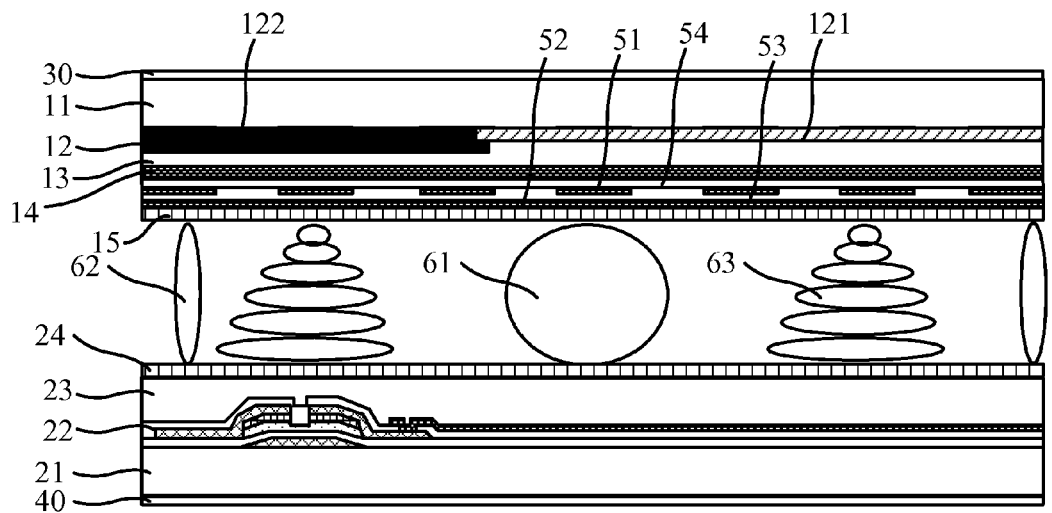
FIG. 6 is a cross-sectional structural schematic diagram of Embodiment 2 of the electromagnetic induction type LC panel provided in Example 3 of the present invention.

Or, as shown in FIG. 6, the first-direction conductive wire 51, the inner interval insulating layer 53, the second-direction conductive wire 52 and the outer interval insulating layer 54 may be formed between the common electrode layer 14 and the first alignment film 15, so that the insulation between the first-direction conductive wire 51 and the common electrode layer 14 is maintained through the outer interval insulating layer 54.

Figure 7:
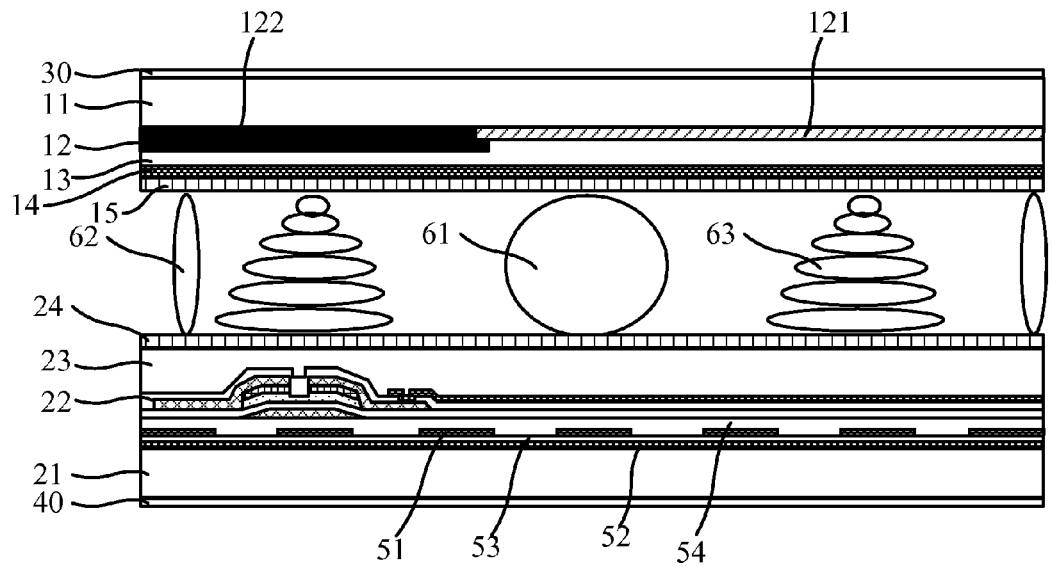
FIG. 7 is a cross-sectional structural schematic diagram of Embodiment 3 of the electromagnetic induction type LC panel provided in Example 3 of the present invention.

Or, as shown in FIG. 7, the first-direction conductive wire 51, the inner interval insulating layer 53, the second-direction conductive wire 52 and the outer interval insulating layer 54 may be formed between the second base substrate 21 and the thin-film transistor driving array film 22, or may also be formed between any two films in the thin-film transistor driving array film 22, so that the insulation is maintained through the outer interval insulating layer 54.

Figure 8:
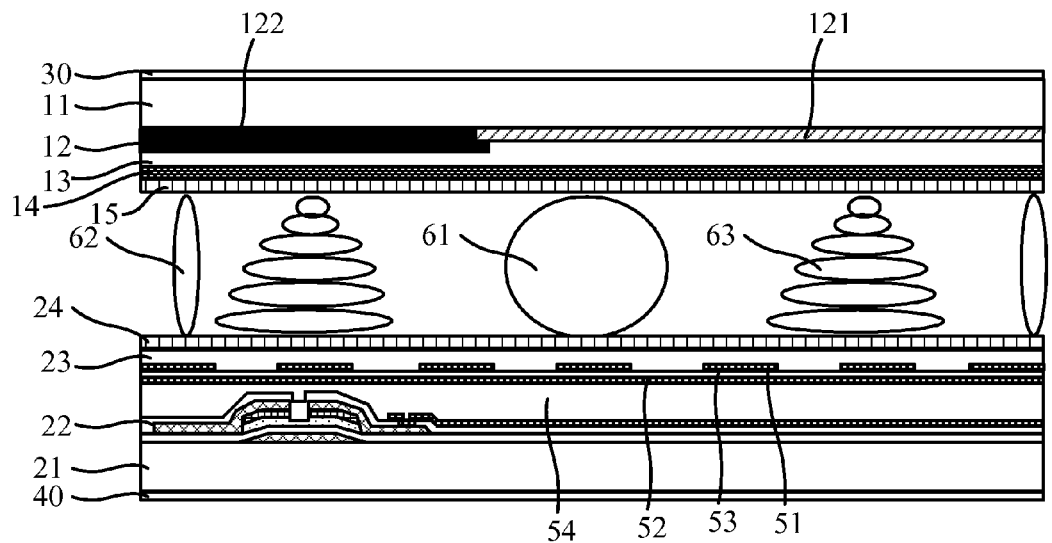
FIG. 8 is a cross-sectional structural schematic diagram of Embodiment 4 of the electromagnetic induction type LC panel provided in Example 3 of the present invention.

Or, as shown in FIG. 8, the first-direction conductive wire 51, the inner interval insulating layer 53, the second-direction conductive wire 52 and the outer interval insulating layer 54 may be formed between the thin-film transistor driving array film 22 and the second protection layer 23, so that the insulation between the second-direction conductive wire 52 and the thin-film transistor driving array film 22 is maintained through the outer interval insulating layer 54.

In the abovementioned technical solution, the insulation between the first-direction conductive wire 51, the second-direction conductive wire 52 and the conductive films is realized by additionally providing the outer interval insulating layer 54.

Or, the first-direction conductive wire and the second-direction conductive wire may be wrapped up with the outer interval insulating layer to form the insulating conductive wires and realize insulation, for example, the U-shaped coils are the enameled wires.

In the present example, the first-direction conductive wire and the second-direction conductive wire are not limited to be disposed at a same position, and they also can be provided at different positions, namely, they can be provided respectively at the different positions between these films and maintain insulation through one or more outer interval insulating layers.

In the technical solution in the present example, by the way of isolating the conductive wires in the antenna array and the conductive material in the LC panel through the outer interval insulating layer, the antenna array is integrated in the LC panel so as to meet the light and thin requirements of the LCD device, save manufacturing and assembly costs, facilitate the antenna array and the LC panel to be tightly combined, and improve the accuracy and reliability of identifying the electromagnetic signal positions.

In the abovementioned Example 2 and Example 3, the antenna array comprises the first-direction conductive wire and the second-direction conductive wire which are perpendicular to each other. Furthermore, the first-direction conductive wire and the second-direction conductive wire may be wrapped up or covered with the insulating transparent film. The first-direction conductive wire and the second-direction conductive wire also can be respectively formed on two surfaces of any one film in the multi-film structures on the color-film substrate and on the array substrate, or formed between the surfaces of any two films as long as the insulation between the conductive wires as well as the insulation between the conductive wires and the conductive films of the LC panel are guaranteed and they can be normally operated. In applications, the electromagnetic signals triggered by the electromagnetic induction pen may avoid the interference of the variable electric field in the LC panel by regulating the frequency, the amplitude and other parameters of electromagnetic signals. Furthermore, the first-direction conductive wire and the second-direction conductive wire may be formed by depositing and etching a transparent conductive film, which will be described hereinafter. Alternatively, the first-direction conductive wire and the second-direction conductive wire may be formed by embedding a transparent conductive film into an insulating film by a thermal melting or thermal pressing process.

In the technical solution of the electromagnetic induction type LC panel of the present invention, according to the resolution requirement of the antenna array, if the conductive wires of the antenna array can be correspondingly provided in the area of the black matrix, the antenna array can be made of any conductive materials and not be limited to the transparent conductive material. The transmission light of the LC panel is not be influenced obviously by the antenna array hidden within the area of the black matrix.

In addition, the antenna array of the above examples of the present invention includes two layers of wires consisting of the first-direction conductive wire and the second-direction conductive wire, but the present invention is not limited to this. The antenna array of the present invention may be one layer of wire, for example, one layer of wire formed by interweaving the U-shaped coils of the first-direction conductive wire and the U-shaped coils of the second-direction conductive wire. In this case, the U-shaped coils are insulated with each other at the crossing points. Or, the antenna array of the present invention may include two or more layers of wires. For example, when the distance between the U-shaped coils of the first-direction conductive wire 51 is too long, with a result of a reduced resolution, two layers of first-direction conductive wires may be disposed to increase the accuracy of detection.

The examples of the present invention also provide a method for manufacturing a LCD substrate, which comprises a step of forming a multi-film structure on a base substrate layer by layer, and before any one film is formed on the base substrate, the method further comprises: forming an antenna array, which is made of conductive material and used for identifying an electromagnetic signal, and the antenna array is insulated from conductive material in the multi-film structure.

The color-film substrate and the array substrate in the LC panel both can be called as the LCD substrate. The present example can be used for manufacturing a first substrate and a second substrate in the electromagnetic induction type LC panel of the present invention. If the antenna array comprises a first-direction conductive wire and a second-direction conductive wire, both of the conductive wires can be formed on one substrate, or they also can respectively formed on the two substrates. The steps of forming the antenna array can specifically have a plurality of forming manners.

Among the abovementioned, one manner is as follows:

the first-direction conductive wire and the second-direction conductive wire as the antenna array are respectively formed at different positions or a same position between the base substrate and a film which are made of insulating material and adjacent to each other or between two films which are made of insulating material and adjacent to each other in the LC panel.

With the adoption of this technical solution, no additional insulating material film is needed, and the insulation between the first-direction conductive wire and the second-direction conductive wire is maintained by the existing insulating material in the LCD substrate.

Another method is as follows:

the first-direction conductive wire and the second-direction conductive wire of the antenna array are respectively formed on the base substrates of insulating material or the films of insulating material in the LCD substrate;

an outer interval insulating layer is formed on the first-direction conductive wire or the second-direction conductive wire.

In this technical solution, the conductive wire is firstly formed, and then the outer interval insulating layer is formed to maintain the insulation between the conductive wire and the conductive material.

Another method is as follows:

the first-direction conductive wire of the antenna array is formed on the base substrate of insulating material or the film of insulating material in the LCD substrate;

an inner interval insulating layer is formed on the first-direction conductive wire; and the second-direction conductive wire of the antenna array is formed on the inner interval insulating layer. Furthermore, an outer interval insulating layer also can be formed on the second-direction conductive wire.

In this technical solution, the first-direction conductive wire and the second-direction conductive wire are provided together, and are insulated from each other by the inner interval insulating layer.

Another method is as follows:

an outer interval insulating layer is formed on the film of conductive material in the LCD substrate;

the first-direction conductive wire or the second-direction conductive wire of the antenna array is formed on the outer interval insulating layer.

In this technical solution, the first-direction conductive wire or the second-direction conductive wire can be formed on a film of the conductive material. Furthermore, another outer interval insulating layer also can be formed on the second-direction conductive wire to maintain the insulation.

Each of the above films can be prepared by a patterning process. For example, the detailed steps of forming the antenna array using the conductive material can be as follows:

depositing a conductive material film, and etching the conductive material film by a patterning process to form a pattern of the antenna array.

The method for manufacturing the LCD substrate of the present invention can specifically be a color-film substrate manufacturing method and an array substrate manufacturing method.

The color-film substrate manufacturing method can be used for preparing the color-film substrate in the electromagnetic induction type LC panel of the present invention. The method comprises the steps of forming the color resin and black matrix layer, the first protection layer, the common electrode layer and the first alignment film on the first base substrate in sequence. Among the abovementioned steps, before any one film is formed, the method further comprises a step of forming the first-direction conductive wire and/or the second-direction conductive wire of the antenna array in a way of insulation, and the antenna array is made of the conductive material and used for identifying an electromagnetic signal.

The step of forming the first-direction conductive wire and/or the second-direction conductive wire of the antenna array in a way of insulation specifically comprises forming the first-direction conductive wire and/or the second-direction conductive wire which are/is wrapped up with the insulation transparent material between the films; or forming the insulating transparent films and forming the first-direction conductive wire and/or the second-direction conductive wire between the insulating transparent films. The insulating transparent films can be the newly added films, or can be the existing insulation material films in the color-film substrate. In addition, the first-direction conductive wire and the second-direction conductive wire also can be formed by embedding a transparent conductive film into an insulating film by a thermal melting or thermal pressing process.

The color-film substrate manufacturing method can be used for manufacturing the color-film substrate in the electromagnetic induction type LC panel of the present invention. All or part of the conductive wires of the antenna array may be provided in the color-film substrate, thus facilitating the LC panel assembled finally to have the electromagnetic induction identification handwriting input function. Furthermore, the LCD device meets the light and thin requirements with the advantages of higher accuracy and more reliability. The present method has the convenient improvement and is easy to be promoted and realized.

As for the LC panel having a typical structure, the method for forming the color resin and black matrix layer, the first protection layer, the common electrode layer and the first alignment film on the first base substrate in sequence specifically can comprise the following steps:

patterns of the color resin and the black matrix are respectively formed on the first base substrate, and the black matrix is formed between the patterns of the color resin at interval to constitute the color resin and black matrix layer;

the first protection layer is coated on the color resin and black matrix layer;

the common electrode layer is deposited on the first protection layer; and the alignment film material is deposited on the common electrode layer, and alignment grooves are formed on the alignment film material to form the first alignment film.

The preferred solutions for forming the antenna array in the color-film substrate are respectively introduced in the followings.

Example 4

Figure 9:
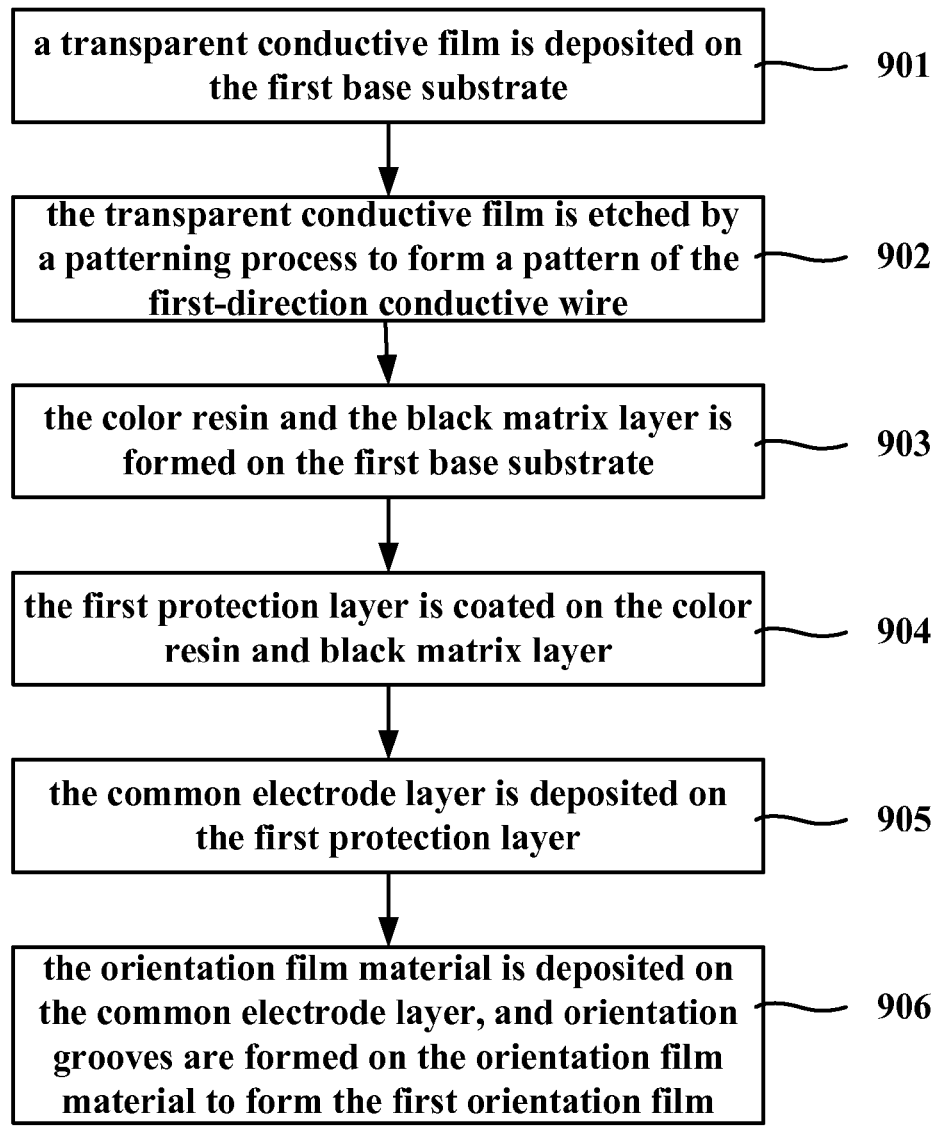
FIG. 9 is a flow diagram of a manufacturing method of a color-film substrate provided in Example 4 of the present invention.

FIG. 9 is a flow diagram of a manufacturing method of a color-film substrate provided in Example 4 of the present invention. For example, in this method, the antenna array is formed before the color resin and black matrix layer is formed. The formed color-film substrate can be referred to as in FIG. 1. The method in the present example specifically comprises the following steps:

in Step 901, a transparent conductive film is deposited on the first base substrate;

in Step 902, the transparent conductive film is etched by a patterning process to form a pattern of the first-direction conductive wire;

in Step 903, the patterns of the color resin and the black matrix are respectively formed on the first base substrate, and the black matrix is formed between the patterns of the color resin at interval to constitute the color resin and black matrix layer;

in Step 904, the first protection layer is coated on the color resin and black matrix layer;

in Step 905, the common electrode layer is deposited on the first protection layer; and in Step 906, the alignment film material is deposited on the common electrode layer, and alignment grooves are formed on the alignment film material to form the first alignment film.

In the present example, the first-direction conductive wire of the antenna array is formed on the first base substrate. The first base substrate is adjacent to the color resin and black matrix layer. Both of the first base substrate and the color resin and black matrix layer are made of the insulating material. Therefore, no additional insulating transparent film is needed with the advantages of simple procedures and low cost. In the abovementioned technical solution, the arrangement of part of the conductive wires of the antenna array can be completed in the color-film substrate. Cooperating with the corresponding array substrate, all of the conductive wires of the antenna array can be provided in the LC panel.

Between Step 902 and Step 903 of the abovementioned example, that is, after the pattern of the first-direction conductive wire is formed, the preparation of the second-direction conductive wire also can be completed as follows:

a second insulating transparent film is formed on the first base substrate on which the first-direction conductive wire is formed;

the transparent conductive film is deposited on the second insulating transparent film;

the transparent conductive film is etched by a patterning process to form a pattern of the second-direction conductive wire, and the second-direction conductive wire and the first-direction conductive wire are perpendicular to each other. The manufactured color-film substrate can be referred to as in FIG. 2, wherein the second insulating transparent film is equivalent to the inner interval insulating layer.

As for the abovementioned technical solution, the arrangement of all of the conductive wires of the antenna array can be completed in the color-film substrate.

Example 5

Figure 10:
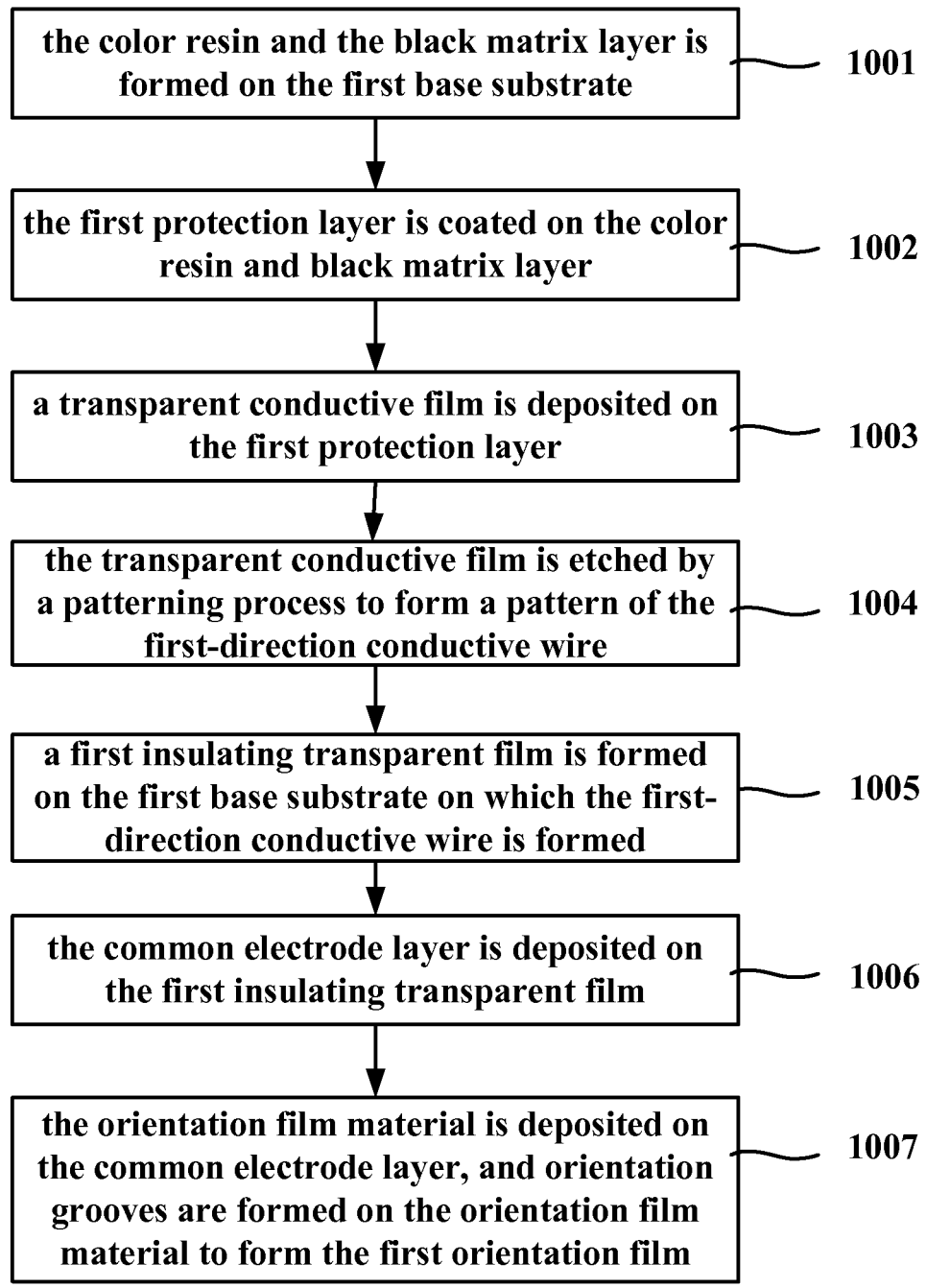
FIG. 10 is a flow diagram of a manufacturing method of a color-film substrate provided in Example 5 of the present invention.

FIG. 10 is a flow diagram of a manufacturing method of a color-film substrate provided in Example 5 of the present invention. In the present method, the antenna array is formed after the first protection layer is coated. The manufactured color-film substrate can be referred to as in FIG. 5. The present method specifically comprises the following steps:

in Step 1001, the patterns of the color resin and the black matrix are respectively formed on the first base substrate, and the black matrix is formed between the patterns of the color resin at interval to constitute the color resin and black matrix layer;

in Step 1002, the first protection layer is coated on the color resin and black matrix layer;

in Step 1003, a transparent conductive film is deposited on the first protection layer;

in Step 1004, the transparent conductive film is etched by a patterning process to form a pattern of the first-direction conductive wire;

in Step 1005, a first insulating transparent film is formed on the first base substrate on which the first-direction conductive wire is formed;

in Step 1006, the common electrode layer is deposited on the first insulating transparent film; and in Step 1007, the alignment film material is deposited on the common electrode layer, and alignment grooves are formed on the alignment film material to form the first alignment film.

The first-direction conductive wire is formed on the insulating first protection layer in the present example. The first insulating transparent film is additionally provided on the first-direction conductive wire and equivalent to the outer interval insulating layer, thus guaranteeing the insulation between the first-direction conductive wire and the common electrode layer. In the abovementioned technical solution, the arrangement of part of the conductive wires of the antenna array can be completed in the color-film substrate. Cooperating with the corresponding array substrate, all of the conductive wires of the antenna array can be provided in the LC panel.

Between Step 1004 and Step 1005 of the abovementioned example, that is, after the pattern of the first-direction conductive wire is formed, the preparation of the second-direction conductive wire also can be completed as follows:

a second insulating transparent film is formed on the first base substrate on which the first-direction conductive wire is formed;

the transparent conductive film is deposited on the second insulating transparent film;

the transparent conductive film is etched by a patterning process to form a pattern of the second-direction conductive wire, and the second-direction conductive wire and the first-direction conductive wire are perpendicular to each other. The second insulating transparent film is equivalent to the inner interval insulating layer, and the first insulating transparent film is equivalent to the outer interval insulating layer.

As for the abovementioned technical solution, the arrangement of all of the conductive wires of the antenna array can be completed in the color-film substrate.

Example 6

Figure 11:
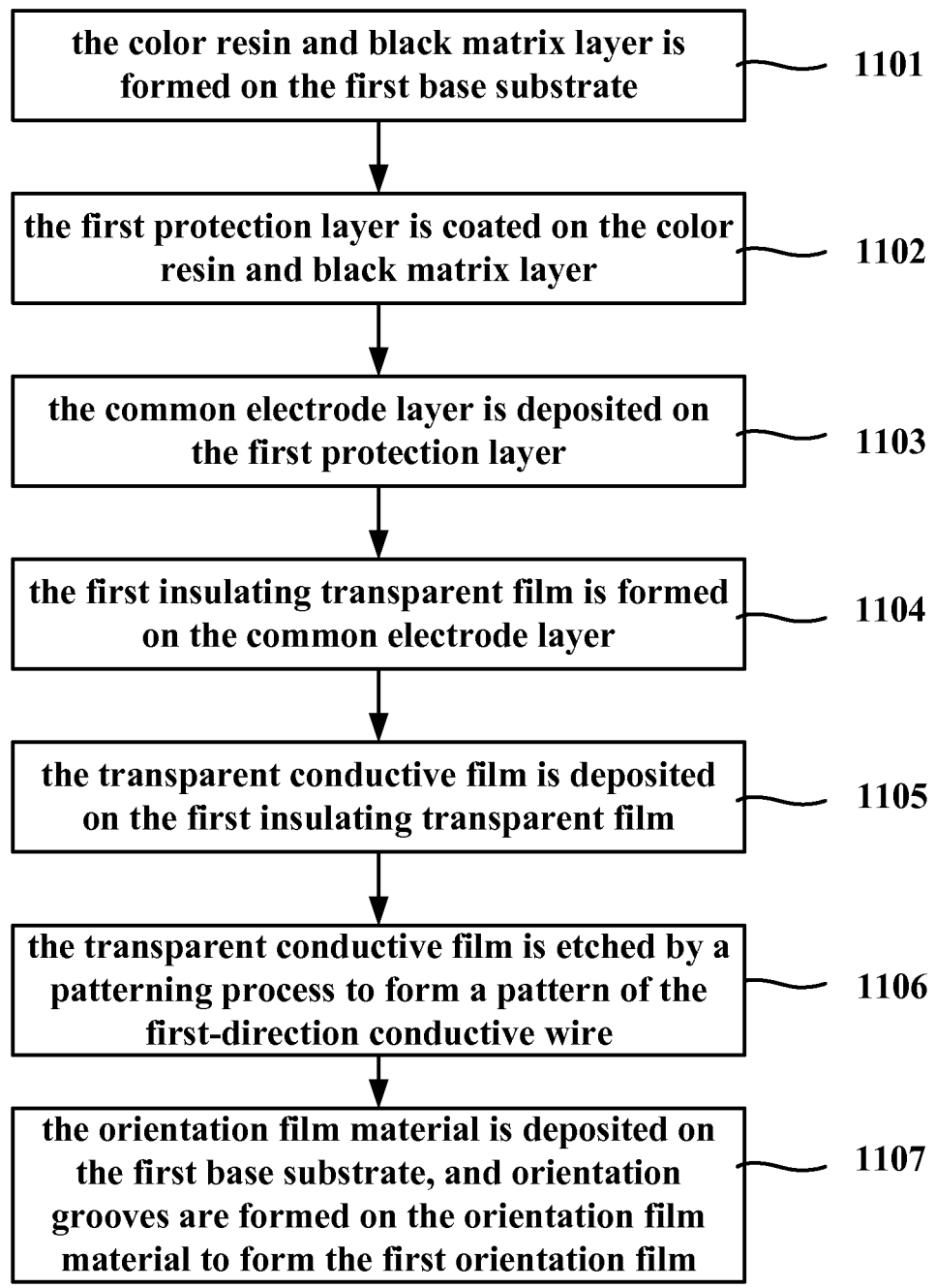
FIG. 11 is a flow diagram of a manufacturing method of a color-film substrate provided in Example 6 of the present invention.

FIG. 11 is a flow diagram of a manufacturing method of a color-film substrate provided in Example 6 of the present invention. In the present method, the antenna array is formed after the common electrode layer is formed. The manufactured color-film substrate can be referred to as in FIG. 6. Specifically, the present method comprises the following steps:

in Step 1101, the patterns of the color resin and the black matrix are respectively formed on the first base substrate, and the black matrix is formed between the patterns of the color resin at interval to constitute the color resin and black matrix layer;

in Step 1102, the first protection layer is coated on the color resin and black matrix layer;

in Step 1103, the common electrode layer is deposited on the first protection layer;

in Step 1104, the first insulating transparent film, which is equivalent to the outer interval insulating layer, is formed on the common electrode layer;

in Step 1105, the transparent conductive film is deposited on the first insulating transparent film;

in Step 1106, the transparent conductive film is etched by a patterning process to form a pattern of the first-direction conductive wire; and in Step 1107, the alignment film material is deposited on the first base substrate, and alignment grooves are formed on the alignment film material to form the first alignment film.

The first insulating transparent film is formed on the common electrode layer in the present example and then the first-direction conductive wire is formed, thus guaranteeing the insulation between the first-direction conductive wire and the common electrode layer. In the abovementioned technical solution, the arrangement of part of the conductive wires of the antenna array can be completed in the color-film substrate. Cooperating with the corresponding array substrate, all of the conductive wires of the antenna array can be provided in the LC panel.

Between Step 1106 and Step 1107 of the abovementioned example, that is, after the pattern of the first-direction conductive wire is formed, the preparation of the second-direction conductive wire also can be completed as follows:

a second insulating transparent film is formed on the first base substrate on which the first-direction conductive wire is formed;

the transparent conductive film is deposited on the second insulating transparent film;

the transparent conductive film is etched by a patterning process to form a pattern of the second-direction conductive wire, and the second-direction conductive wire and the first-direction conductive wire are perpendicular to each other. The second insulating transparent film is equivalent to the inner interval insulating layer, and the first insulating transparent film is equivalent to the outer interval insulating layer.

As for the abovementioned technical solution, the arrangement of all of the conductive wires of the antenna array can be completed in the color-film substrate.

In the example of the present invention, the antenna array can also be prepared on the color resin and black matrix layer.

The abovementioned color-film substrate manufacturing methods can be used for the preparation of the color-film substrate in the electromagnetic induction type LC panel in any one of the examples of the present invention, and the concrete preparation process is not limited to the abovementioned methods. In the above manufacturing methods, with a simple production process, the antenna array is integrated between the films of the color-film substrate, thus improving the integration level and reducing the thickness of products as well as the assembly cost. Furthermore, the identification accuracy and reliability can be increased by the tight combination of the antenna array and the LC panel.

The manufacturing method of the LCD substrate of the present invention is also an array substrate manufacturing method, which is used for manufacturing an array substrate in the electromagnetic induction type LC panel of the present invention. The present method comprises the steps of forming the thin-film transistor driving array film, the second protection layer and the second alignment film on the second base substrate in sequence. Before any one film is formed, the method further comprises the step of forming the first-direction conductive wire and/or the second-direction conductive wire of the antenna array in a way of insulation, and the antenna array is made of the conductive material and used for identifying an electromagnetic signal.

The step of forming the first-direction conductive wire and/or the second-direction conductive wire of the antenna array in a way of insulation specifically comprises forming the first-direction conductive wire and/or the second-direction conductive wire which are/is wrapped up with the insulation transparent material between the films, or forming the insulating transparent films and forming the first-direction conductive wire and/or the second-direction conductive wire between the insulating transparent films. The insulating transparent films can be the newly added films, or can be the existing insulation material films in the array substrate.

The array substrate manufacturing method can be used for manufacturing the array substrate in the electromagnetic induction type LC panel of the present invention. All or part of the conductive wires of the antenna array may be provided in the array substrate, thus facilitating the LC panel assembled finally to have the electromagnetic induction identification handwriting input function. Furthermore, the LCD device meets the light and thin requirements with the advantages of higher accuracy and more reliability. The present method has the convenient improvement and is easy to be promoted and realized.

As for the LC panel having a typical structure, the method for forming the thin-film transistor driving array film, the second protection layer and the second alignment film on the second base substrate in sequence specifically can comprise the following steps:

the conductive material is adopted to respectively form the patterns of the thin-film transistor driving array film on the second base substrate;

using the insulating material, the second protection layer is coated on the abovementioned second base substrate, that is, on the thin-film transistor driving array film; and using the insulating material, the alignment film material is deposited on the second base substrate, that is, on the second protection layer, and alignment grooves are formed on the alignment film material to form the second alignment film.

The preferred solutions for forming the antenna array in the array substrate are respectively introduced in the followings.

Example 7

Figure 12:
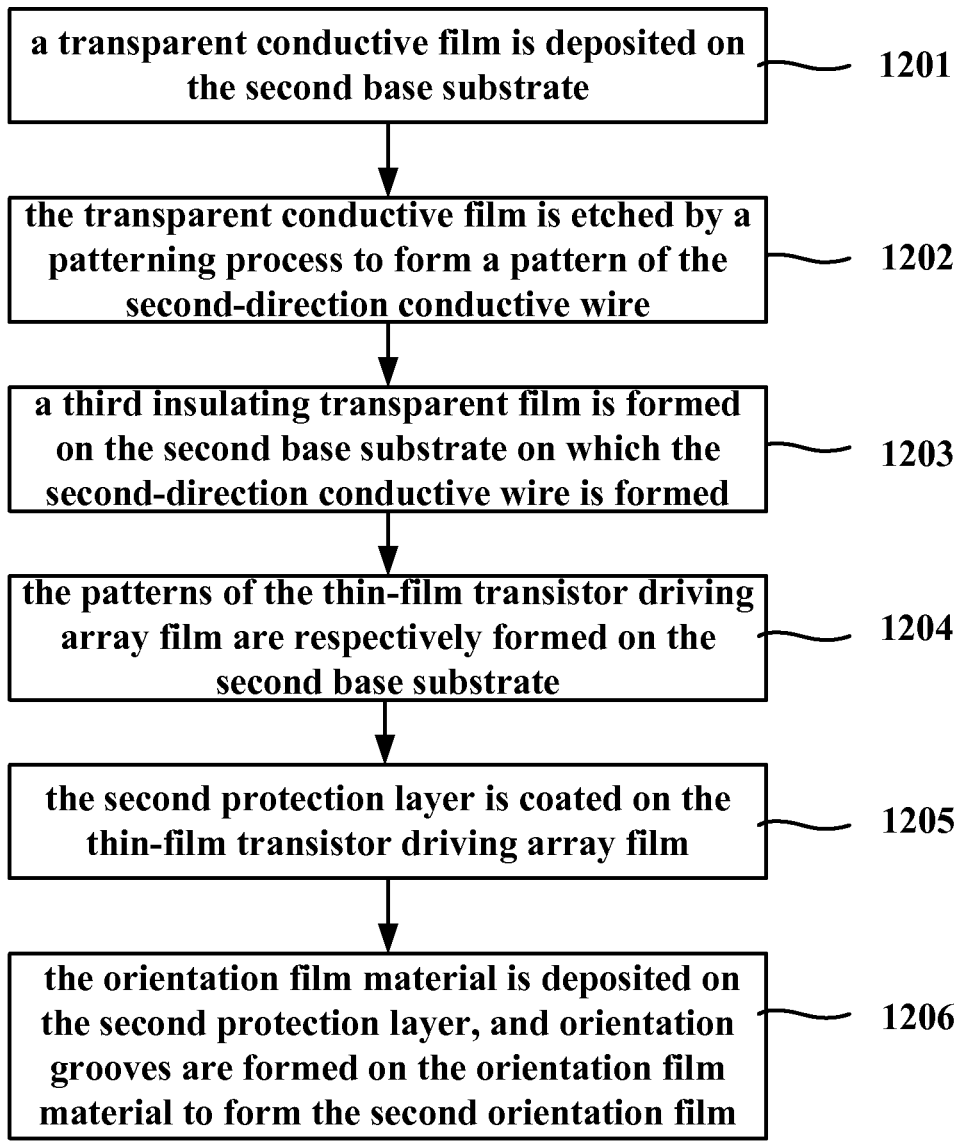
FIG. 12 is a flow diagram of a manufacturing method of an array substrate provided in Example 7 of the present invention.

FIG. 12 is a flow diagram of a manufacturing method of an array substrate provided in Example 7 of the present invention. In this method, the antenna array is formed before the thin-film transistor driving array film is formed. The formed array substrate can be referred to as in FIG. 7. The method in the present example specifically comprises the following steps:

in Step 1201, a transparent conductive film is deposited on the second base substrate;

in Step 1202, the transparent conductive film is etched by a patterning process to form a pattern of the second-direction conductive wire;

in Step 1203, a third insulating transparent film is formed on the second base substrate on which the second-direction conductive wire is formed;

in Step 1204, the patterns of the thin-film transistor driving array film are respectively formed on the second base substrate;

in Step 1205, the second protection layer is coated on the thin-film transistor driving array film; and in Step 1206, the alignment film material is deposited on the second protection layer, and alignment grooves are formed on the alignment film material to form the second alignment film.

In the present example, the pattern of the second-direction conductive wire is formed on the second base substrate, then the third insulating transparent film, being equivalent to the outer interval film, is formed, thereby guaranteeing the insulation between the second-direction conductive wire and the thin-film transistor driving array film. In the abovementioned technical solution, the arrangement of part of the conductive wires of the antenna array can be completed in the array substrate. Cooperating with the corresponding color-film substrate, all of the conductive wires of the antenna array can be provided in the LC panel.

Between Step 1202 and Step 1203 of the abovementioned example, that is, after the pattern of the second-direction conductive wire is formed, the preparation of the first-direction conductive wire also can be completed as follows:

a fourth insulating transparent film is formed on the second base substrate on which the second-direction conductive wire is formed;

the transparent conductive film is deposited on the fourth insulating transparent film;

the transparent conductive film is etched by a patterning process to form a pattern of the first-direction conductive wire, and the second-direction conductive wire and the first-direction conductive wire are perpendicular to each other. The fourth insulating transparent film is equivalent to the inner interval insulating layer, and the third insulating transparent film is equivalent to the outer interval insulating layer.

As for the abovementioned technical solution, the arrangement of all of the conductive wires of the antenna array can be completed in the array substrate.

Example 8

Figure 13:
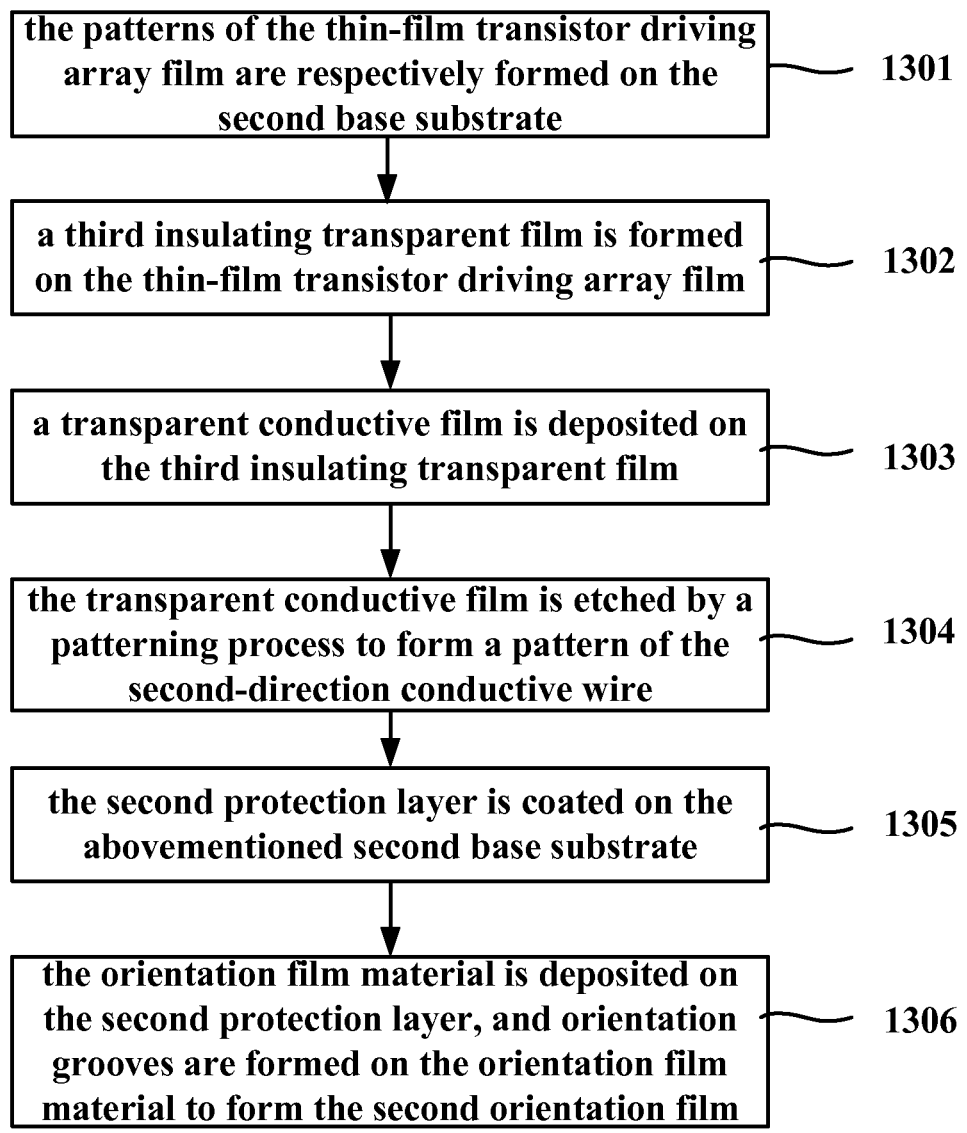
FIG. 13 is a flow diagram of a manufacturing method of an array substrate provided in Example 8 of the present invention.

FIG. 13 is a flow diagram of a manufacturing method of an array substrate provided in Example 8 of the present invention. In the present method, the antenna array is formed after the thin-film transistor driving array film is formed. The formed array substrate can be referred to as in FIG. 8. The method in the present example specifically comprises the following steps:

in Step 1301, the patterns of the thin-film transistor driving array film are respectively formed on the second base substrate;

in Step 1302, a third insulating transparent film is formed on the thin-film transistor driving array film, and is equivalent to an outer interval insulating layer. Preferably, the third insulating transparent film can be made of organic material and has the function of planarization at the same time;

in Step 1303, a transparent conductive film is deposited on the third insulating transparent film;

in Step 1304, the transparent conductive film is etched by a patterning process to form a pattern of the second-direction conductive wire;

in Step 1305, the second protection layer is coated on the abovementioned second base substrate; and in Step 1306, the alignment film material is deposited on the second protection layer, and alignment grooves are formed on the alignment film material to form the second alignment film.

In the present example, the third insulating transparent film is firstly formed on the thin-film transistor driving array film, and then the pattern of the second-direction conductive wire are formed, thus guaranteeing the insulation between the second-direction conductive wire and the thin-film transistor driving array film. In the abovementioned technical solution, the arrangement of part of the conductive wire of the antenna array can be completed in the array substrate. Cooperating with the corresponding color-film substrate, all of the conductive wires of the antenna array can be provided in the LC panel.

Between Step 1305 and Step 1306 of the present example, that is, after the pattern of the second-direction conductive wire is formed, the preparation of the first-direction conductive wire also can be completed as follows:

a fourth insulating transparent film is formed on the second base substrate on which the second-direction conductive wire is formed;

a transparent conductive film is deposited on the fourth insulating transparent film;

the transparent conductive film is etched by a patterning process to form the pattern of the first-direction conductive wire, and the second-direction conductive wire and the first-direction conductive wire are perpendicular to each other. The fourth insulating transparent film is equivalent to the inner interval insulating layer.

As for the abovementioned technical solution, the arrangement of all of the conductive wires of the antenna array can be completed in the array substrate.

Example 9

Figure 14:
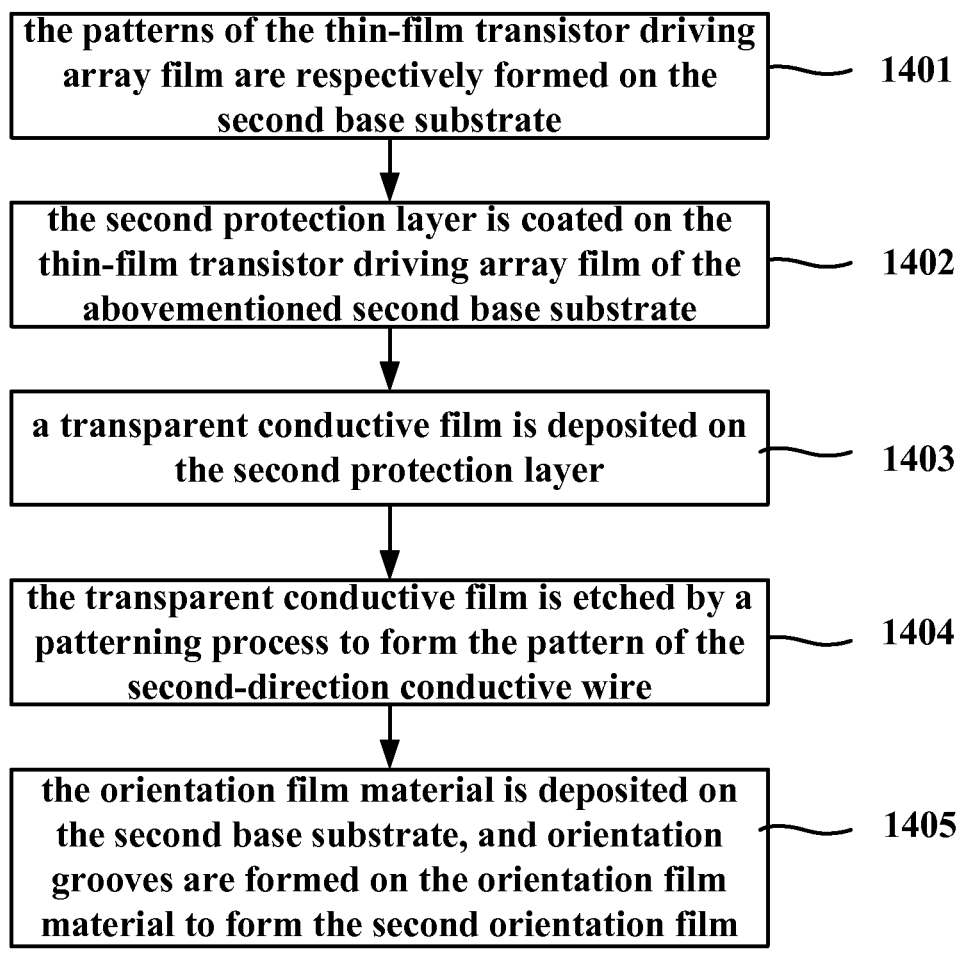
FIG. 14 is a flow diagram of a manufacturing method of an array substrate provided in Example 9 of the present invention.
Figure 15:
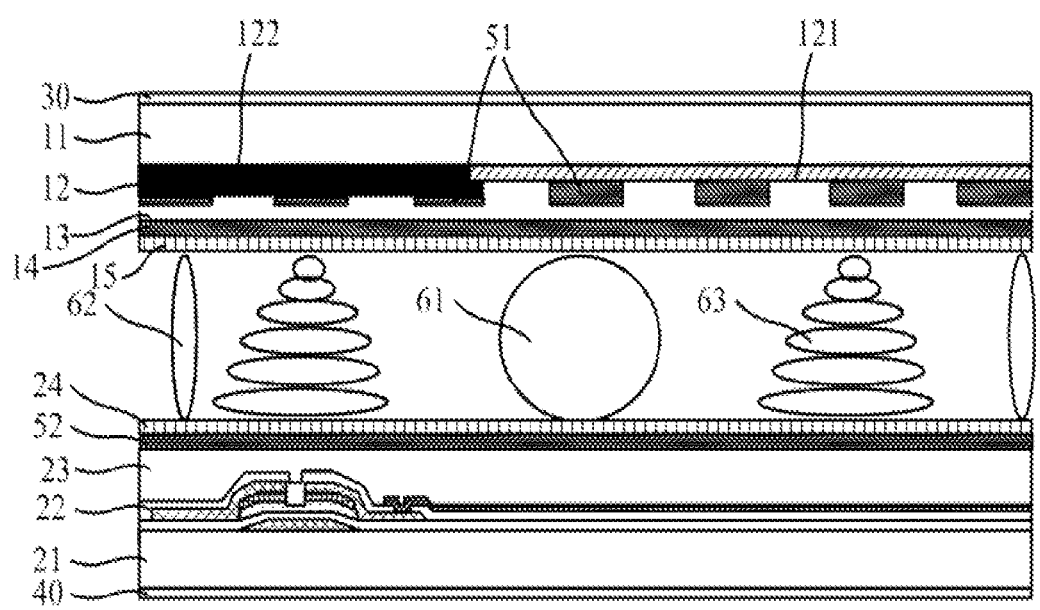

FIG. 14 is a flow diagram of a manufacturing method of an array substrate provided in Example 9 of the present invention. In the present method, the antenna array is formed after the second protection layer is formed. The formed array substrate can be referred to as in FIG. 4. The method in the present example specifically comprises the following steps:

in Step 1401, the patterns of the thin-film transistor driving array film are respectively formed on the second base substrate;

in Step 1402, the second protection layer is coated on the thin-film transistor driving array film of the abovementioned second base substrate;

in Step 1403, a transparent conductive film is deposited on the second protection layer;

in Step 1404, the transparent conductive film is etched by a patterning process to form the pattern of the second-direction conductive wire; and in Step 1405, the alignment film material is deposited on the second base substrate, and alignment grooves are formed on the alignment film material to form the second alignment film.

The second-direction conductive wire is formed on the second protection layer in the present example. The second protection layer and the second alignment film guarantee the insulation of the second-direction conductive wire. In the abovementioned technical solution, the arrangement of part of the conductive wires of the antenna array can be completed in the array substrate. Cooperating with the corresponding color-film substrate, all of the conductive wires of the antenna array can be provided in the LC panel.

Between Step 1404 and Step 1405 of the abovementioned example, that is, after the pattern of the second-direction conductive wire is formed, the preparation of the first-direction conductive wire also can be completed as follows:

a fourth insulating transparent film is formed on the second base substrate on which the second-direction conductive wire is formed;

a transparent conductive film is deposited on the fourth insulating transparent film; and the transparent conductive film is etched by a patterning process to form the pattern of the first-direction conductive wire, and the second-direction conductive wire and the first-direction conductive wire are perpendicular to each other. The fourth insulating transparent film is equivalent to the inner interval insulating layer.

As for the abovementioned technical solution, the arrangement of all of the conductive wires of the antenna array can be completed in the array substrate.

In the example of the present invention, the first-direction conductive wire and/or the second-direction conductive wire of the antenna array also can be prepared on any one of films of the thin-film transistor driving array film.

The formed thin-film transistor driving array film has a plurality of forming processes, wherein a typical preparation process comprises:

a gate metal layer is deposited on the second base substrate, and a pattern including a gate electrode and a gate scanning line is formed by a patterning process;

a gate insulating layer is deposited on the abovementioned second base substrate;

a semiconductor film, a doped semiconductor film and a source and drain metal film are deposited on the abovementioned second base substrate, a pattern including a semiconductor layer, a doped semiconductor layer, a source electrode, a drain electrode and a data scanning line is formed by a patterning process;

a passivation layer is deposited on the abovementioned second base substrate, and a passivation-layer through hole is formed by a patterning process; and a transparent conductive film is deposited on the abovementioned second base substrate, and a pattern including a pixel electrode is formed by a patterning process, wherein the pixel electrode is connected with the drain electrode through the passivation-layer through hole.

After any one of the above films of the thin-film transistor driving array film is formed, the process further comprises that the first-direction conductive wire and/or the second-direction conductive wire are/is formed in a way of insulation.

For example, an insulating transparent film can be formed on the pattern including the gate electrode and the gate scanning line. And then a transparent conductive material is deposited, and a pattern of the second-direction conductive wire is formed by a patterning process. And then another insulating transparent film is formed, and the transparent conductive material is deposited again to form a pattern of the first-direction conductive wire by a patterning process. Thereafter, the gate insulating layer is deposited.

The method for preparing the antenna array on the other films is similar to this method. When the film closely adjacent to the antenna array is the insulating layer, the first-direction and/or the second-direction conductive wire in the antenna array can be directly formed. Otherwise, the conductive wire wrapped up with an insulating layer is arranged, or the insulation is maintained through the preparation of the transparent insulation film. The first-direction conductive wire and the second-direction conductive wire are not limited to be adjacently provided, and they can respectively be provided at different positions between the films.

The abovementioned array substrate manufacturing methods can be used for the preparation of the array substrate in the electromagnetic induction type LC panel in any one of the examples of the present invention, and the concrete preparation process is not limited to the abovementioned methods. In addition, the first-direction conductive wire and the second-direction conductive wire also can be formed by embedding a transparent conductive film into an insulating film by a thermal melting or thermal pressing process. In the above manufacturing methods, with a simple production process, the antenna array is integrated between the films of the array substrate, thus improving the integration level and reducing the thickness of products as well as the assembly cost. Furthermore, the identification accuracy and reliability can be increased by the tight combination of the antenna array and the LC panel.

Liquid Crystal Display (LCD) Device

The examples of the present invention also provide an LCD device, which adopts the electromagnetic induction type LC panel of the present invention and further comprises a backlight module and a frame. The backlight module and the LC panel as well as other accessories all can be embedded and fixed in the frame. The LCD device further comprises an input identification circuit, which can be provided on the side of the LC panel and connected with an output terminal of the antenna array for identifying the electromagnetic signals received by the antenna array from an electromagnetic induction pen and generating input signals to be displayed on the LCD device or as an input control.

The LCD device of the present invention has an electromagnetic induction identification handwriting input function. Furthermore, as the antenna array is integrated in the LC panel, the thickness of the LCD device is hardly increased, thereby meeting the light and thin requirements and reducing the assembly cost. The antenna array is integrated in the LCD device, thus increasing the identification accuracy and reliability of the antenna array.

Finally, it should be noted that the above embodiments are merely provided for describing the technical solutions of the present invention, but not intended to limit the present invention. It should be understood by those of ordinary skill in the art that although the present invention has been described in detail with reference to the foregoing embodiments, modifications can be made to the technical solutions described in the foregoing embodiments, or equivalent replacements can be made to some technical features in the technical solutions, as long as such modifications or replacements do not cause the essence of corresponding technical solutions to depart from the scope of the present invention.

What is claimed is:

1. An electromagnetic induction type LC panel, comprising a first substrate and a second substrate facing each other and a liquid crystal layer filled between the first substrate and the second substrate; the first substrate and the second substrate respectively comprise a first base substrate and a second base substrate as well as multi-film structures respectively formed on the first base substrate and the second base substrate, wherein:

the LC panel further comprises an antenna array, which is made of conductive material, formed between the first base substrate and the second base substrate, insulated from conductive material in the multi-film structures and used for identifying an electromagnetic signal, the antenna array comprises a first-direction conductive wire and a second-direction conductive wire; and the first-direction conductive wire and the second-direction conductive wire are respectively formed at any two positions between the base substrate and a film which are made of insulating material and adjacent to each other or between two other films which are made of insulating material and adjacent to each other in the LC panel.

2. The electromagnetic induction type LC panel according to claim 1, wherein:

the multi-film structure on the first substrate, starting from one side adjacent to the first base substrate, comprises a color resin and black matrix layer, a first protection layer, a common electrode layer and a first alignment film in sequence;

the multi-film structure on the second substrate, starting from one side adjacent to the second base substrate, comprises a thin-film transistor driving array film, a second protection layer and a second alignment film in sequence; and the any two positions are selected from the following positions:

a position between the first base substrate and the color resin and black matrix layer; or a position between the color resin and black matrix layer and the first protection layer; or a position between the second protection layer and the second alignment film.

3. The electromagnetic induction type LC panel according to claim 1, wherein the antenna array is made of transparent conductive material.

4. A liquid crystal display device adopting the electromagnetic induction type liquid crystal panel according to claim 1, also comprising a backlight module and a frame, wherein the liquid crystal display device further comprises an input identification circuit connected with an output terminal of the antenna array.

5. A method for manufacturing a liquid crystal display substrate, comprising a step of forming a multi-film structure on a base substrate layer by layer, wherein before any one film is formed on the base substrate, the method further comprises:

forming an antenna array, which is made of conductive material and used for identifying an electromagnetic signal, and the antenna array is insulated from conductive material in the multi-film structure, wherein forming the antenna array comprises:

forming a first-direction conductive wire and a second-direction conductive wire respectively at any two positions between the base substrate and a film which are made of insulating material and adjacent to each other or between two other films which are made of insulating material and adjacent to each other in the LC panel.

6. The method for manufacturing the liquid crystal display substrate according to claim 5, wherein forming the antenna array comprises:

depositing a conductive material film, and etching the conductive material film by a patterning process to form a pattern of the antenna array.

7. The method for manufacturing the liquid crystal display substrate according to claim 5, wherein the step of forming the multi-film structure on the base substrate layer by layer comprises:

forming patterns of a color resin and a black matrix on the base substrate respectively, wherein the black matrix is formed between the patterns of the color resin to constitute a color resin and black matrix layer;

coating a first protection layer on the base substrate including the color resin and black matrix layer using insulating material;

depositing a common electrode layer on the base substrate including the first protection layer using conductive material; and depositing an alignment film material on the base substrate including the common electrode layer using insulating material, and forming alignment grooves on the alignment film material to form a first alignment film.

8. The method for manufacturing the liquid crystal display substrate according to claim 5, wherein the step of forming the multi-film structure on the base substrate layer by layer comprises:

forming patterns of a thin-film transistor driving array film on the base substrate respectively using conductive material;

coating a second protection layer on the base substrate including the thin-film transistor driving array film using insulating material;

depositing alignment film material on the base substrate including the second protection layer using insulating material, and forming alignment grooves on the alignment film material to form a second alignment film.

9. The method for manufacturing the liquid crystal display substrate according to claim 8, wherein the any two positions are selected from the following positions:

a position between the first base substrate and the color resin and black matrix layer; or a position between the color resin and black matrix layer and the first protection layer; or a position between the second protection layer and the second alignment film.

* * * * *